US007311824B2

(12) United States Patent
Yoshida et al.

(10) Patent No.: US 7,311,824 B2
(45) Date of Patent: Dec. 25, 2007

(54) FINE PARTICLE SEPARATION TREATMENT SYSTEM AND CYCLONE SEPARATOR

(76) Inventors: Hideto Yoshida, c/o Hiroshima University 4-1, Kagamiyama 1-chome, Higashi Hiroshima-shi, Hiroshima (JP); Kunihiro Fukui, Room Number301, Ko-po N Plaza,7-7 Saijou - cho Shitami 6 - chome, Higashi Hiroshima - shi,Hiroshima (JP); Kazuaki Takahashi, c/o Takahashi Co., Ltd., 1312-8, Ooaza busshi, Iruma - shi, Saitama (JP); Junichi Nakamura, c/o Takahashi Co., Ltd., 1312 - 8, Ooaza busshi, Iruma - shi, Saitama (JP)

( * ) Notice: Subject to any disclaimer, the term of this patent is extended or adjusted under 35 U.S.C. 154(b) by 383 days.

(21) Appl. No.: 10/821,152

(22) Filed: Apr. 8, 2004

(65) Prior Publication Data

US 2005/0087080 A1 Apr. 28, 2005

(30) Foreign Application Priority Data

Oct. 10, 2003 (JP) ............................ 2003-352774
Feb. 18, 2004 (JP) ............................ 2004-041454
Feb. 20, 2004 (JP) ............................ 2004-043868

(51) Int. Cl.
*B01D 21/26* (2006.01)
*B01D 21/28* (2006.01)
*B04C 5/14* (2006.01)
*B04C 5/30* (2006.01)
*B04C 9/00* (2006.01)
*B03C 5/02* (2006.01)

(52) U.S. Cl. .................. 210/195.1; 210/196; 210/223; 210/243; 210/257.1; 210/260; 210/294; 210/512.1

(58) Field of Classification Search ............... 210/695, 210/748, 788, 805, 806, 194, 197, 222, 223, 210/243, 294, 512.1, 195.1, 196, 257.1, 260
See application file for complete search history.

(56) References Cited

U.S. PATENT DOCUMENTS 6,355,178 B1 * 3/2002 Couture et al. ............. 210/748
6,913,684 B1 * 7/2005 Barak et al. ................ 205/742

FOREIGN PATENT DOCUMENTS

JP 2001-137743 5/2001
WO WO03/045569 A1 6/2003

* cited by examiner

*Primary Examiner*—David A Reifsnyder
(74) *Attorney, Agent, or Firm*—Flynn, Thiel, Boutell & Tanis, P.C.

(57) ABSTRACT

The present invention provides a fine particle separation treatment system containing: a storage tank for storing a solution; a solution circulating passageway for circulating the solution in the storage tank, a cyclone separator disposed in the solution circulating passageway for separating fine particles in the solution and a particle trap box for trapping the precipitated fine particles in the cyclone portion through a communication hole. An electrode rod is disposed at the center of the particle trap box, and the fine particles are electrically separated by applying a potential between the electrode rod and an electrode of the particle trap box.

9 Claims, 10 Drawing Sheets

Fig.8

| COMPO – SITION | $SiO_2$ STARTING MATERIAL | NO ELECTRODES | | STANDARD ELECTRODE VOLTAGE OF 50V APPLIED | | ENLOGATED ELECTRODE VOLTAGE OF 50V APPLIED | | CONICAL ELECTRODE VOLTAGE OF 50V APPLIED | |
|---|---|---|---|---|---|---|---|---|---|
| | | CRUDE POWEDER | FINE POWDER | CRUDE POWEDER | FINE POWDER | CRUDE POWEDER | FINE POWDER | CRUDE POWEDER | FINE POWDER |
| Si | 100 | 100 | 99.348 | 99.8 | 99.901 | 100 | 100 | 99.885 | 99.969 |
| Ca | | | 0.307 | | | | | | |
| Fe | | | 0.153 | 0.121 | 0.099 | | | 0.115 | |
| Ni | | | 0.081 | 0.079 | | | | | |
| Zn | | | 0.08 | | | | | | |
| Zr | | | 0.031 | | | | | | 0.031 |

EFFECT OF THE POTENTIAL APPLIED ON FINE PARTICLE TRAP BOX ON THE SEPARATION PERFORMANCE

FINE PARTICLE SEPARATION TREATMENT SYSTEM AND CYCLONE SEPARATOR

BACKGROUND OF THE INVENTION

1. Field of the Invention

The present invention relates to a fine particle separation treatment system for obtaining high purity fine particles and a solution by eliminating impurities therefrom, and a cyclone separator.

2. Description of the Related Art

Specified fine particles contained in a solution are separated by filtration from the solution in the production processes of pharmaceuticals, chemicals, semiconductors and functional materials. On the other hand, a machining object is machined by supplying a cutting liquid from a feed tank, and the cutting liquid containing fine powder as machining refuse is supplied to a filter device to remove the machining refuse with a filter device for circulating the cutting liquid to the feed tank (for example, Japanese Unexamined Patent Application Publication No. 2001-137743).

However, impurities in the tank and pipe-lines adhere to the fine particles in the treatment passageway when the specified fine particles contained in the oil are recovered by filtration, or when the machining refuse is removed from the cutting liquid by filtration. Accordingly, obtaining a desired purity of a solution of fine particles and cutting liquid presents some technical restrictions. While it is possible to improve the purity by combining the filter device with an ion-exchange apparatus, the structure of the system becomes complex, increasing the processing cost.

SUMMARY OF THE INVENTION

Accordingly, it is an object of the invention based on the situations above to provide a fine particle separation treatment system having a simple structure and capable of obtaining high purity fine particles and solutions with a low processing cost, and a cyclone separator used for the purpose.

The present invention for solving the above problems and for attaining the above objects is constructed as follows.

In a first aspect, the present invention provides a fine particle separation treatment system comprising: a storage tank for storing a solution; a solution-circulating passageway for circulating the solution in the storage tank; and a cyclone separator disposed in the solution-circulating passageway for separating fine particles in the solution. The cyclone separator comprises: an inlet passageway communicating with a solution outlet side of the storage tank; a flow-out passageway communicating with a solution outlet side of the storage tank; a cyclone portion for generating an eddy flow at a given flow rate by feeding a fine particle-containing solution from the inlet passageway, transferring the fine particles to an outer periphery of the cyclone portion by centrifugal force to separate the fine particles from the solution flowing through the flow-out passageway, and precipitating the separated fine particles by decelerating the eddy flow; and a particle trap box for trapping the precipitated fine particles in the cyclone portion through a communication hole. An electrode rod is disposed at the center of the particle trap box and the fine particles are electrically separated by applying a potential between the electrode rod and an electrode of the particle trap box.

According to the construction above, impurity ions in the solution, which migrate by electrophoresis due to an electric field, adhere to the electrode rod or on the electrode of the particle trap box to lessen the amount of adhesion of the ions on the surface of the fine particles. Accordingly, high purity fine particles or a solution can be obtained with a low treatment cost using a system having a simple structure.

Preferably, the fine particles are electrically separated by charging the electrode rod with the same electric charge as that of the fine particles, and by charging the electrode of the particle trap box with an electric charge opposed to that of the fine particles. This construction also affords the same effect as described above.

Preferably, the solution-circulation passageway further comprises various devices that are operated or work using the solution, particularly a high purity solution.

Preferably, the upper end of the electrode rod extends to the lower part of the cyclone portion. The fine particles distributed from the lower part of the cyclone portion having a slow solution flow rate to the particle trap box are transferred from the center to the outer periphery. Consequently, the fine particles adhere to the lower part of the cyclone portion and the particle trap box prevent the fine particles from being scattered. Accordingly, the fine particles can be efficiently trapped in the particle trap box.

Preferably, a conical electrode is provided at the upper end of the electrode rod, and this conical electrode is positioned so as to abut the communication hole so that the fine particles precipitated in the particle trap box are prevented from floating from the lower part of the cyclone portion where the solution flows slowly.

Preferably, the cyclone portion comprises a cylinder part positioned at the upper part of the cyclone portion and a downwardly tapered portion connected to the cylinder part, and the length of the electrode bar is greater than the diameter of the cylinder part. Consequently, the electrode bar is able to provide a large electric charge to the fine particles allowing the fine particles to be transferred into the particle trap box from the lower part of the cyclone portion while preventing the fine particles from being scattered. Accordingly, the fine particles are efficiently trapped in the particle trap box.

Preferably, the distance between the electrode of the particle trap box and the electrode rod is larger than the diameter of the communication hole. Since the distance between the electrode of the particle trap box and the electrode rod is larger than the diameter of the communication hole and narrow, the fine particles can be transferred into the particle trap box from the lower part of the cyclone portion and maintained there while preventing the fine particles from being scattered. Accordingly, the fine particles are efficiently trapped in the particle trap box. While there is no space for trapping the fine particles in the particle trap box when the distance is smaller than the diameter of the communication hole, such a space can be ensured when the space is larger than the diameter of the communication hole.

In a second aspect, the present invention provides a cyclone separator comprising: a cyclone portion for generating an eddy flow at a given flow rate by feeding a fine particle-containing solution, transferring the fine particles to the outer periphery by centrifugal force to separate the fine particles, and precipitating the separated fine particles by decelerating the eddy flow; and a particle trap box for trapping the precipitated fine particles in the cyclone portion through a communication hole. An electrode rod is disposed at the center of the particle trap box, and the electrode rod is charged with the same electric charge as that of the fine particles. The above construction permits the fine particles to be transferred from the center to the outer side in the particle trap box where the flow rate of the solution is low to permit the fine particles to adhere to the inner wall of the particle trap box, or to prevent the fine particles from being scattered. Consequently, the fine particles are efficiently trapped in the particle trap box.

In a third aspect, the present invention provides a cyclone separator comprising: a cyclone portion for generating an eddy flow at a given flow rate by feeding a fine particle-containing solution, transferring the fine particles to the outer periphery by centrifugal force to separate the fine particles, and precipitating the separated fine particles by decelerating the eddy flow; and a particle trap box for trapping the precipitated fine particles in the cyclone portion through a communication hole. The electrode of the particle trap box is charged with an electric charge opposed to that of the electric charge of the fine particles. This construction also affords the same effect as described above.

In a fourth aspect, the present invention provides a cyclone separator comprising: a cyclone portion for generating an eddy flow at a given flow rate by feeding a fine particle-containing solution, transferring the fine particles to the outer periphery by centrifugal force to separate the fine particles, and precipitating the separated fine particles by decelerating the eddy flow; and a particle, trap box for trapping the precipitated fine particles in the cyclone portion through a communication hole. An electrode rod is disposed at the center of the particle trap box, the electrode rode is charged with the same electric charge as that of the fine particles, and the electrode of the particle trap box is charged with an electric charge opposed to that of the fine particles. This construction also affords the same effect as described above.

BRIEF DESCRIPTION OF THE DRAWINGS

FIG. 8 is a numerical expression of the purity of the fine particles;

DESCRIPTION OF THE PREFERRED EMBODIMENTS

While embodiments of the fine particle separation treatment system of the present invention are described hereinafter, the present invention is not restricted to these embodiments. While the embodiments of the present invention show the best mode for carrying out the present invention, the terms in the present invention are not restricted thereto.

The fine particle separation treatment system in the embodiments is able to selectively afford high purity fine particles for separating specified fine particles in a solution in the production processes of pharmaceuticals, chemicals, semiconductors and functional materials. The system can also be used for removing impurity ions in a solution.

Figure 1:
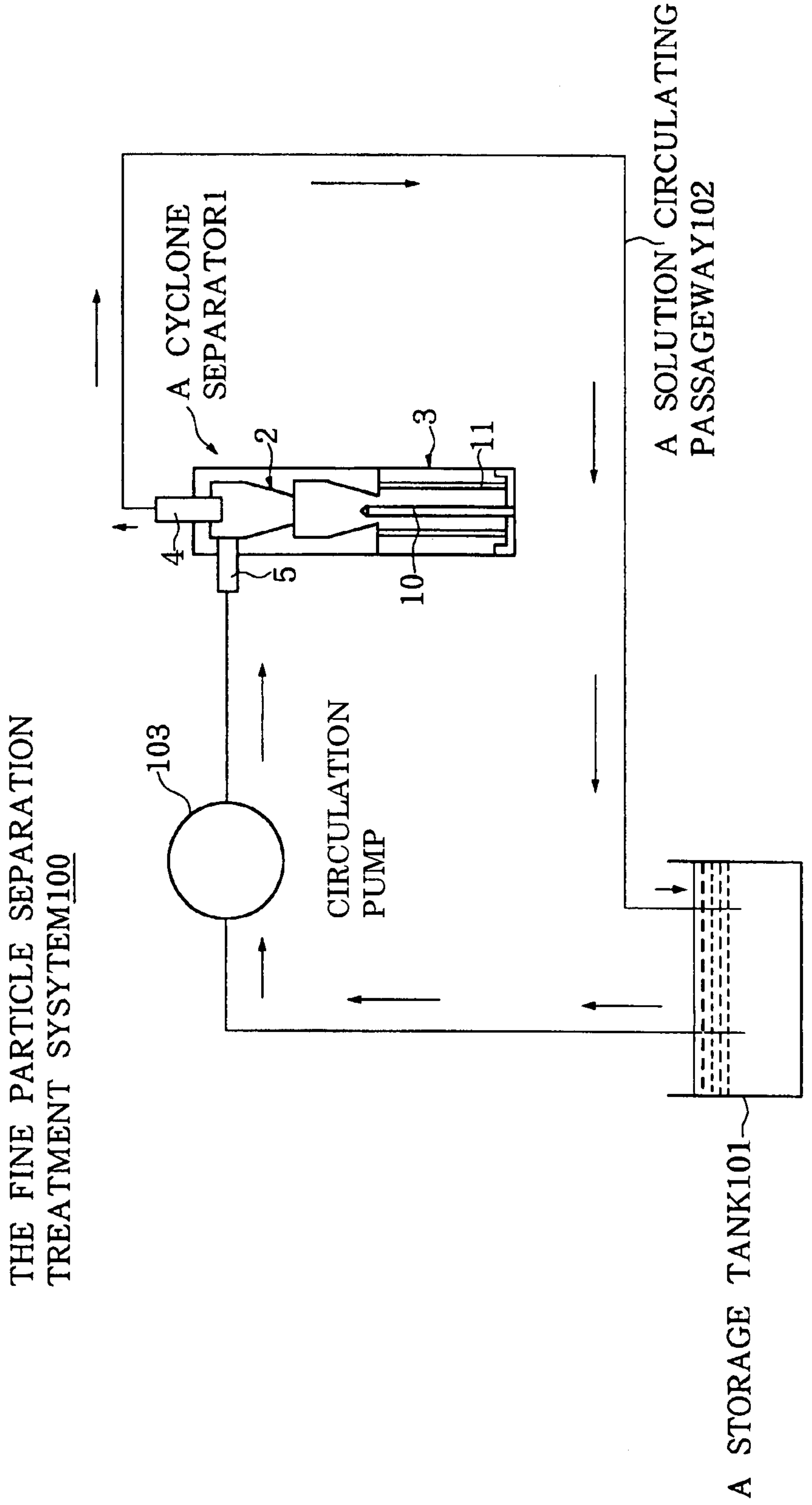
FIG. 1 is a schematic drawing of the fine particle separation treatment system.

An example of the fine particle separation treatment system in this embodiment is shown in FIG. 1, which is a schematic drawing of the fine particle separation treatment system. The fine particle separation treatment system 100 comprises a storage tank 101 for storing a solution, a solution circulating passageway 102 for circulating the solution in the storage tank 101, and a cyclone separator 1 disposed in the solution circulating passageway 102 for separating fine particles in the solution. The solution circulating passageway 102 comprises a circulation pump 103 for circulating the solution.

The cyclone separator 1 comprises an inlet passageway 5 communicating with a solution outlet side of the storage tank 101, a flow-out passageway 4 communicating with a solution inlet side of the storage tank 101, a cyclone portion 2 for generating an eddy flow at a given flow rate through the feeding of a fine particle-containing solution from the inlet passageway, transferring the fine particles to an outer periphery by centrifugal force to separate the fine particles from the solution exiting from the flow-out passageway 4, and precipitating the separated fine particles by decelerating the eddy flow, and a fine particle trap box 3 for trapping the precipitated fine particles in the cyclone portion 2 through a communication hole.

An electrode bar 10 is disposed at the center of the fine particle trap box 3, and the fine particles are electrically trapped by applying a potential between the electrode bar 10 and an electrode 11 of the fine particle trap box 3. In the fine particle separator (cyclone separator) 1, the fine particles separated in the cyclone portion 2 by decelerating the eddy flow are precipitated, and the fine particles precipitated in the cyclone portion 2 are collected in the particle trap box 3 through the communication hole. The electrode rod 10 positioned at the center of the particle trap box 3 is charged with the same electric charge as that of the fine particles, and the electrode 11 of the particle trap box 3 is charged with an electric charge opposed to that of the fine particles. Consequently, impurity ions in the solution, which migrate by electrophoresis due to an electric field, adhere to the electrode 11 of the particle trap box 3 having a large surface area to lessen the amount of adhesion of the ions on the surface of the fine particles. Accordingly, high purity fine particles or a high purity solution may be obtained using a simple structure system with a low processing cost.

Alternatively, the electrode rod 10 disposed at the center of the particle trap box 3 is charged with an electric charge opposed to that of the fine particles, and the electrode 11 of the particle trap box 3 is charged with the same electric charge as that of the fine particles to permit the impurity ions in the solution, which migrate by electrophoresis due to an electric field, to adhere to the electrode bar 10. The electrode rod 10 can be readily exchanged or cleaned in this case.

Figure 2:
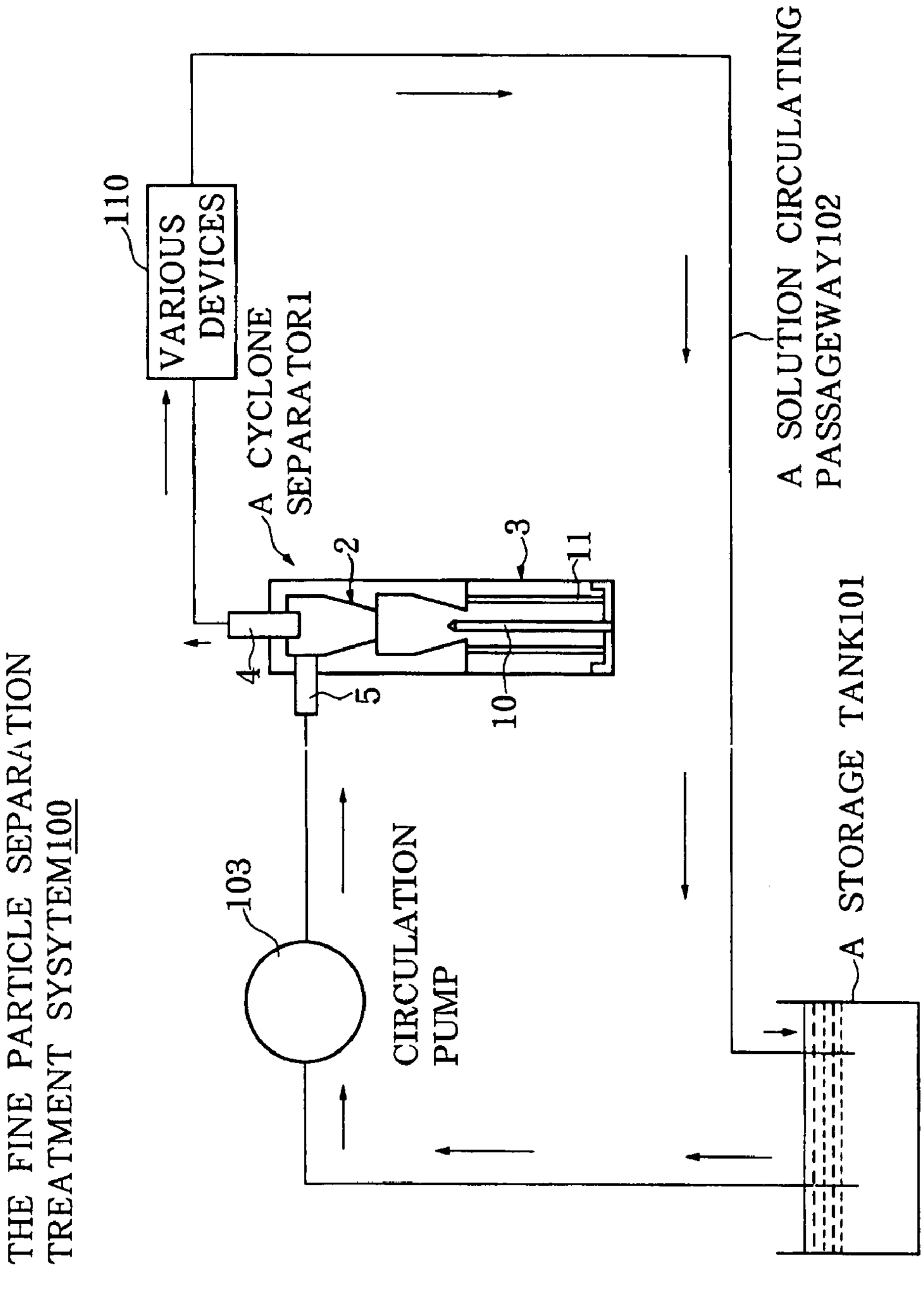
FIG. 2 is a schematic drawing of the fine particle separation treatment system in another embodiment.

Another example of the embodiment of the fine particle separation treatment system is shown in FIG. 2 as a schematic drawing. The fine particle separation treatment system 100 in this embodiment comprises a storage tank 101 for storing a solution, a solution circulation passageway 102 for circulating the solution in the storage tank 101, a cyclone separator 1 disposed in the solution circulation passageway 102 for removing impurities in the solution, and various devices 110. The cyclone separator 1 is constructed as shown in FIG. 1. While the various devices 110 include an electric spark machine that is operated or works using the solution, a high purity solution may be used for the electric spark machine by the cyclone separator 1.

Figure 3:
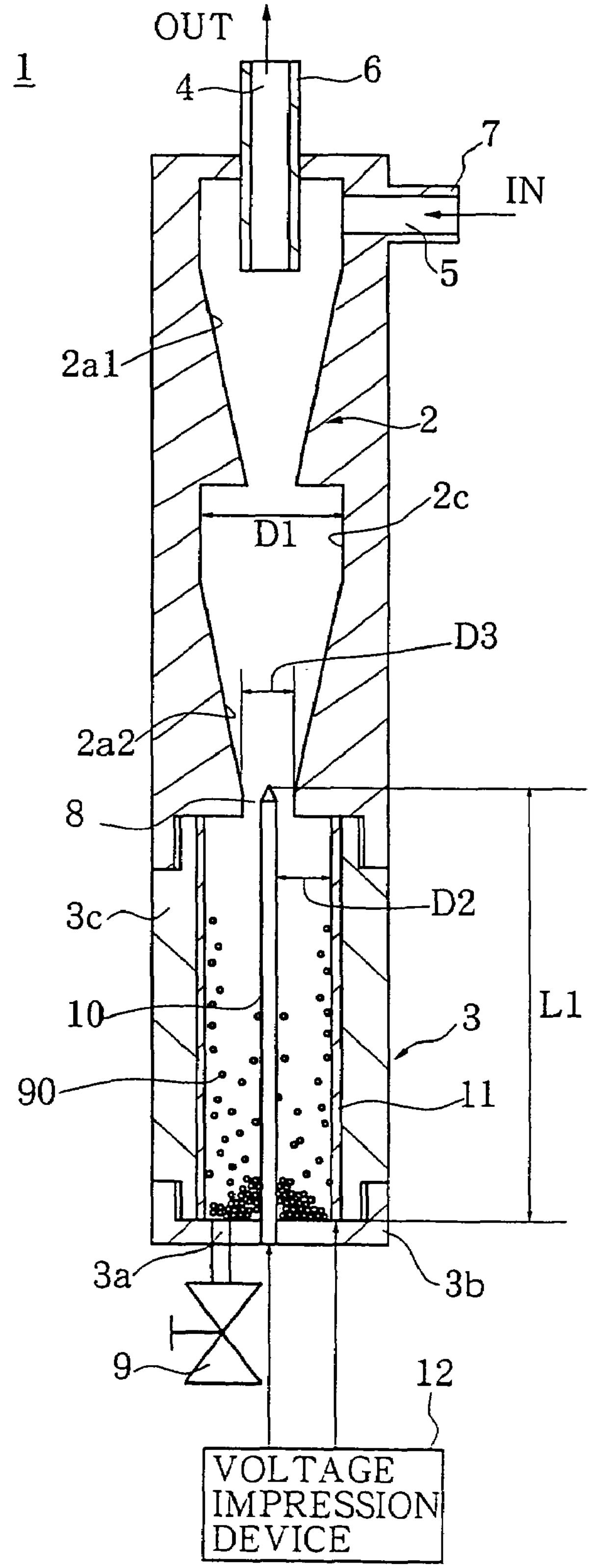
FIG. 3 is a cross-section of the cyclone separator.
Figure 4:
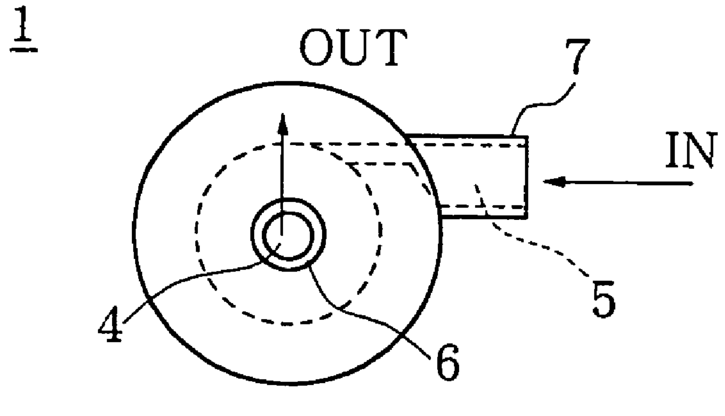
FIG. 4 is a plane view of the cyclone separator.

The construction of the cyclone separator 1 will be described with reference to FIGS. 3 and 4. FIG. 3 shows a cross-section of the cyclone separator, while FIG. 4 shows a plane view thereof. The cyclone separator 1 in this embodiment comprises a cyclone portion 2 and a particle trap box 3 aligned in a vertical direction. The cyclone portion 2 is formed of an insulating material or a conductive metal such as SUS. A flow-out passageway 4 is provided at the center of the axis at the upper part of the cyclone portion 2, and an inlet passageway 5 is provided at a position that deviates from the center of the axis. The flow-out passageway 4 is formed of a pipe 6 penetrating through the top of the cyclone portion 2, and the inlet passageway 5 is formed of a pipe 7 integrated with the upper part of the cyclone portion 2.

The cyclone portion 2 comprises two stages of tapered parts 2*a*1 and 2*a*2, and the lower tapered part 2*a*2 communicates with the particle trap box 3 through a communication hole 8. An eddy flow is formed at a given flow rate by feeding a solution containing fine particles 90 from the inlet passageway 5 of the cyclone portion 2, and the fine particles 90 are transferred to the outer periphery by applying a centrifugal force to separate the fine particles 90 from the solution exiting the flow-out passageway 4. The separated fine particles 90 are precipitated by decelerating the eddy flow.

The separated fine particles 90 precipitating in the cyclone portion 2 fall down into the particle trap box 3 through a communication hole 8 and accumulate in the particle trap box 3. A drain valve 9 is connected to a lower part drain port 3*a* of the particle trap box 3, and the fine particles 90 that have accumulated in the particle trap box 3 are drained through the drain valve 9.

An electrode rod 10 is disposed at the center of the particle trap box 3 in the cyclone separator 1 of this embodiment, and the electrode rod 10 is elongated upwardly from a lower part cover 3*b* of the particle trap box 3 so as to abut the communication hole 8. The lower part cover 3*b* of the particle trap box 3 is attached to a particle trap cylinder 3*c*, which is attached to the lower part of the cyclone portion 2. The particle trap cylinder 3*c* is made of an insulating material such as a resin, and a metal ring electrode 11 is provided within the particle trap cylinder 3*c*.

A voltage impression device 12 charges the electrode bar 10 with the same electric charge as that of the fine particles 90, and the electrode 11 of the particle trap box 3 is charged with an electric charge opposed to that of the fine particles 90. Since the fine particles 90 contained in the solution are negatively charged by an electrostatic charge generated during the treatment, the electrode bar 10 as a negative electrode is negatively charged by applying a negative potential, and the electrode 11 of the particle trap box 3 as a positive electrode is positively charged by applying a positive potential.

The cyclone portion 2 has a downwardly tapered portion 2*a*2 connected to the upper part of the cylinder 2*c*, and the length L1 of the electrode bar 10 is made so as to be larger than the diameter D1 of the cylinder part 2*c*. Determining the length L1 of the electrode bar 10 as described above permits the electric charge of the electrode bar 10 to be increased to allow the fine particles to be transferred from the lower part of the cyclone portion 2 to the particle trap box 3. Moreover, the fine particles 90 are prevented from being scattered, thereby enabling the fine particles 90 to be efficiently trapped in the particle trap box 3.

The distance D2 between the electrode 11 of the particle trap box 3 and the electrode bar 10 is larger than the diameter D3 of the communication hole 8. When the distance D2 between the electrode 11 of the particle trap box 3 and the electrode bar 10 is small, the fine particles 90 are prevented from being scattered by being maintained in the particle trap box 3 being transferred from the lower part of the cyclone portion 2 into the particle trap box 3. Accordingly, the fine particles 90 are efficiently trapped in the particle trap box 3. While there remains no space for trapping the fine particles 90 in the particle trap box 3 when the distance D2 is smaller than the diameter D3 of the communication hole 8, the space for trapping the fine particles 90 can be ensured by increasing the distance D2 so as to be larger than the diameter D3 of the communication hole 8.

The separated fine particles 90 that precipitate in the cyclone portion 2 fall down into the particle trap box 3 through the communication hole 8 and accumulate there in the cyclone separator 1 in this embodiment. The fine particles 90 tend to float in the vicinity of the center of the particle trap box 3 where the flow rate of the solution is low. However, the fine particles 90 can be transferred from the center to the outer side by disposing the electrode bar 10 at the center of the particle trap box 3, charging the electrode bar 10 with the same electric charge as that of the fine particles 90, and by charging the metal ring electrode 11 of the particle trap box 3 with an electric charge opposed to that of the fine particles 90. The fine particles 90 adhere to the inner wall of the metal ring electrode 11 of the particle trap box 3, or are prevented from being scattered, enabling the fine particles 90 to be efficiently trapped in the particle trap box 3.

The impurity ions in the solution, which migrate by electrophoresis due to an electric field, adhere to the electrode 11 of the particle trap box 3 having a large surface area, to lessen the amount of adhesion of the ions on the surface of the fine particles. Accordingly, high purity fine particles or a high purity solution may be obtained using a simple structure system with a low processing cost. While the electrode bar 10 is charged with the same electric charge as that of the fine particles 90 while the particle trap box 3 is charged with an electric charge opposed to that of the fine particles in this embodiment, at least one of the electrodes may be charged.

Figure 5:
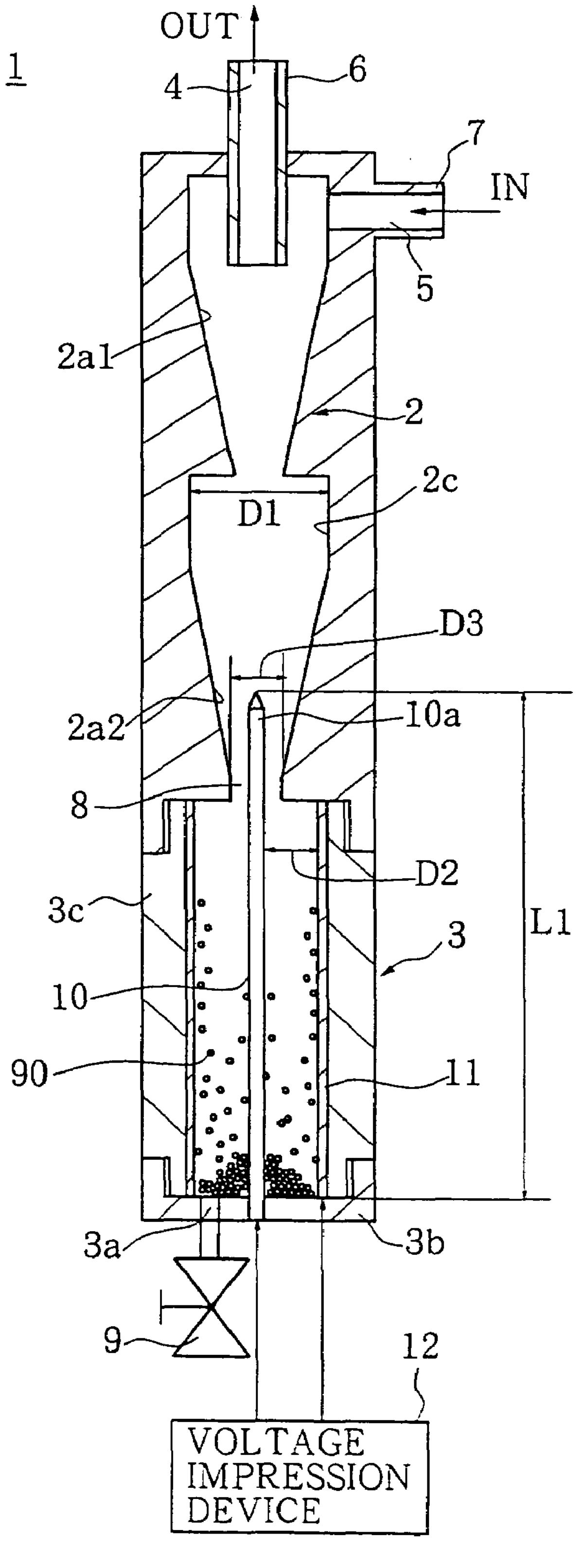
FIG. 5 is a cross-section of another cyclone separator.

FIG. 5 shows a cross-section of an example of the cyclone separator in another embodiment. The same construction elements of the cyclone separator 1 in this embodiment as those in FIGS. 3 and 4 are given the same reference numerals, and descriptions thereof are omitted.

A top end 10*a* of the electrode bar 10 is extended to the lower part of the cyclone portion 2 in the cyclone separator 1 in this embodiment. Extending the top end 10*a* of the electrode bar 10 to the lower part of the cyclone portion 2 permits the fine particles 90 distributed from the lower part of the cyclone portion, where the flow rate of the solution is low, to the particle trap box 3 to be transferred from the center to the outer side. The fine particles 90 adhere to the inner wall at the lower part of the cyclone portion 2 and on the inner wall of the particle trap box 3, or the fine particles are prevented from being scattered. Consequently, the fine particles 90 are efficiently trapped in the particle trap box 3.

Figure 6:
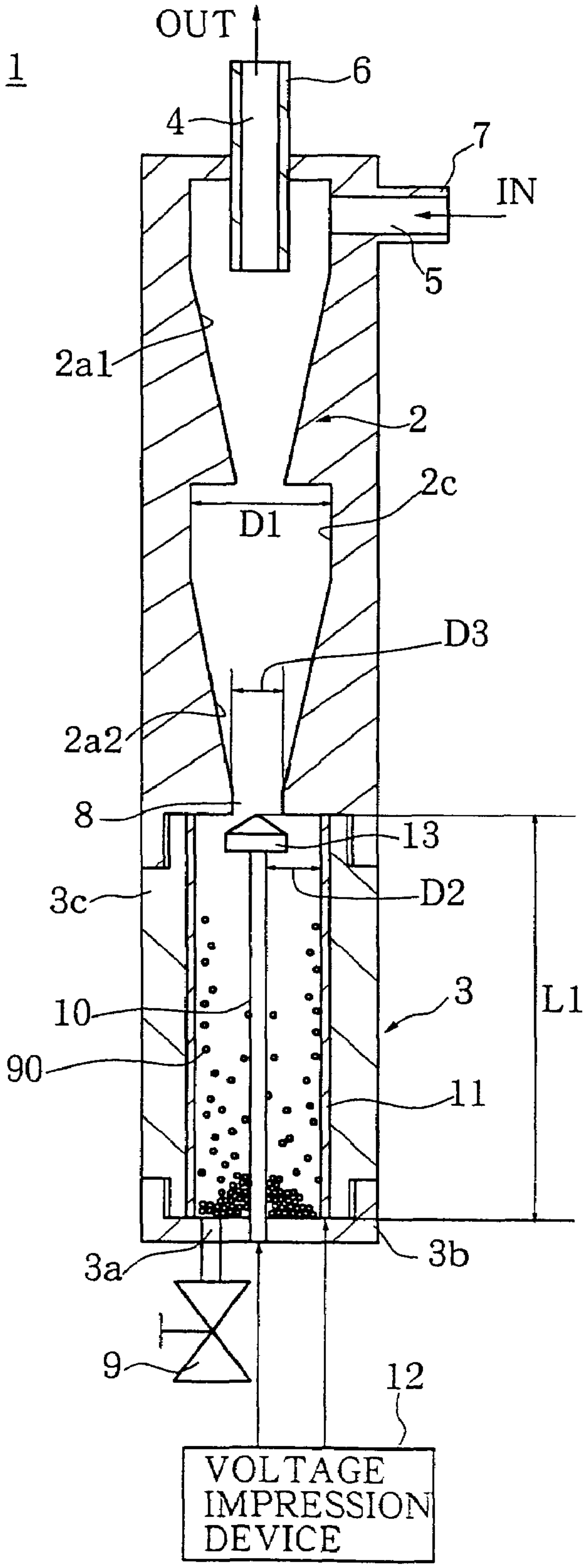
FIG. 6 is a cross-section of a different cyclone separator.

FIG. 6 shows a cross-section of an example of the cyclone separator in another embodiment. The same construction elements of the cyclone separator 1 in this embodiment as those in FIGS. 3 and 4 are given the same reference numerals, and descriptions thereof are omitted.

A conical electrode 13 is provided at the top end of the electrode bar 10 in the cyclone separator 1 in this embodiment, and the conical electrode 13 is positioned so as to face the communication hole 8. The fine particles 90 precipitated within the particle trap box 3 are prevented from flowing through the communication hole 8 by the conical electrode 13.

EXAMPLE

The adhesion of silica particles was tested using: the cyclone separator (FIG. 7A) having no electrodes as shown in FIGS. 3 and 4; the cyclone separator (FIG. 7B) as shown in FIGS. 1 and 2; the cyclone separator (FIG. 7C) as shown in FIG. 5; and the cyclone separator (FIG. 7D) as shown in FIG. 6. A dispersion solution of silica particles in ion-exchange water was used as a sample.

Figure 7:
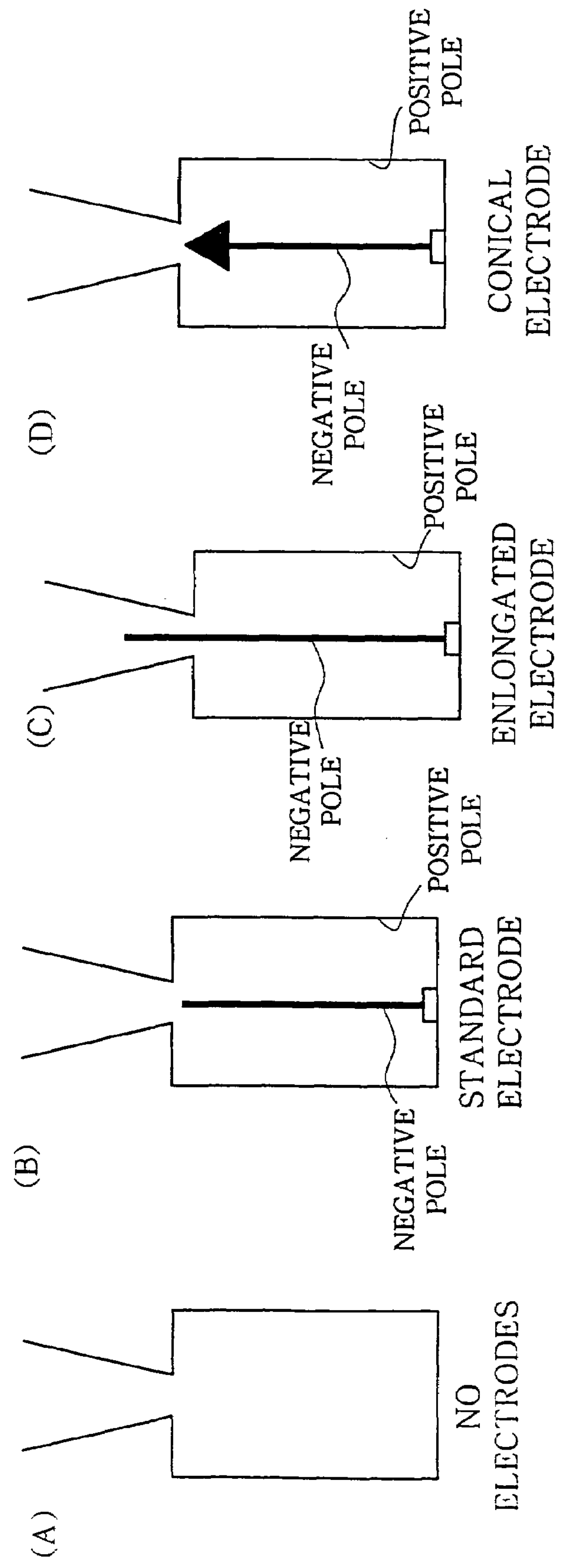
FIGS. 7A to 7D show cyclone separators in examples of the present invention and in comparative examples.
Figure 9:
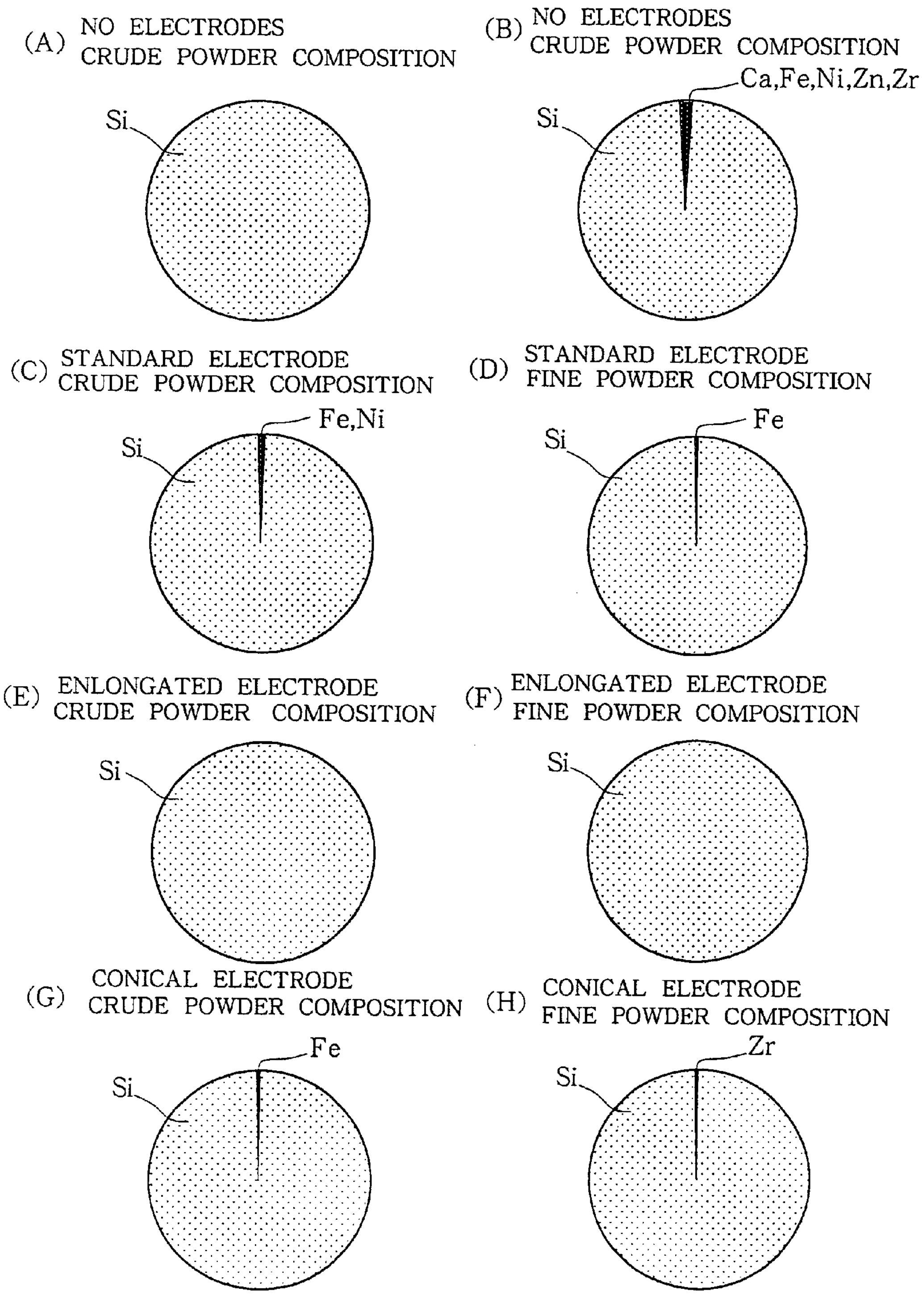
FIGS. 9A to 9H show circle graphs of the purity of the fine particles.

The results of measurements are shown in FIGS. 8 and 9. Compositions of crude powders (silica powder before separation with the cyclone separator) and separated fine powders relative to the proportion of silicon (Si: 100%) in a silicon dioxide powder as a starting material are shown in FIG. 8, wherein the powders were subjected to separation treatments using the cyclone separator having (a) no electrode as shown in FIG. 7A, (b) the standard electrode shown in FIG. 7B with an applied voltage of 50 V, (c) the elongated electrode shown in FIG. 7C with an applied voltage of 50 V, and (d) the conical electrode shown in FIG. 7D with an applied voltage of 50 V. FIGS. 9A to 9H show circle graphs representing respective data in FIG. 8.

While the crude powder comprises 100% of Si (FIG. 9A), the separated fine powder comprises 99.348% of Si with a balance of adhered impurities such as calcium (Ca), iron (Fe), nickel (Ni), zinc (Zn) and zirconium (Zr) as shown in FIG. 9B when the cyclone separator having no electrode shown in FIG. 7A was used, showing that the impurities had evidently adhered to the separated fine powder.

While the crude powder comprises 99.8% of Si with adhered Fe and Ni (FIG. 9C), the separated fine powder comprises 99.901% of Si with a small proportion of adhered Fe (FIG. 9D) when the cyclone separator having the standard electrode (FIG. 7B) was used with an applied voltage of 50 V. The results show that there is no large difference in the Si content between the separated fine powder and crude powder, and substantially no impurities had adhered to the fine powder.

The proportion of Si was 100% in both the crude powder and fine powder (FIGS. 9E and 9F) when the cyclone separator having the elongated electrode (FIG. 7C) was used with an applied voltage of 50 V.

While the crude power comprises 99.885% of Si with adhered Fe and Ni (FIG. 9G), the separated fine powder comprises 99.969% of Si with a small proportion of adhered Zr (FIG. 9H) when the cyclone separator having the conical electrode (FIG. 7D) was used with an applied voltage of 50 V. There is no substantial difference in the purity between the crude powder and fine powder.

Figure 10:
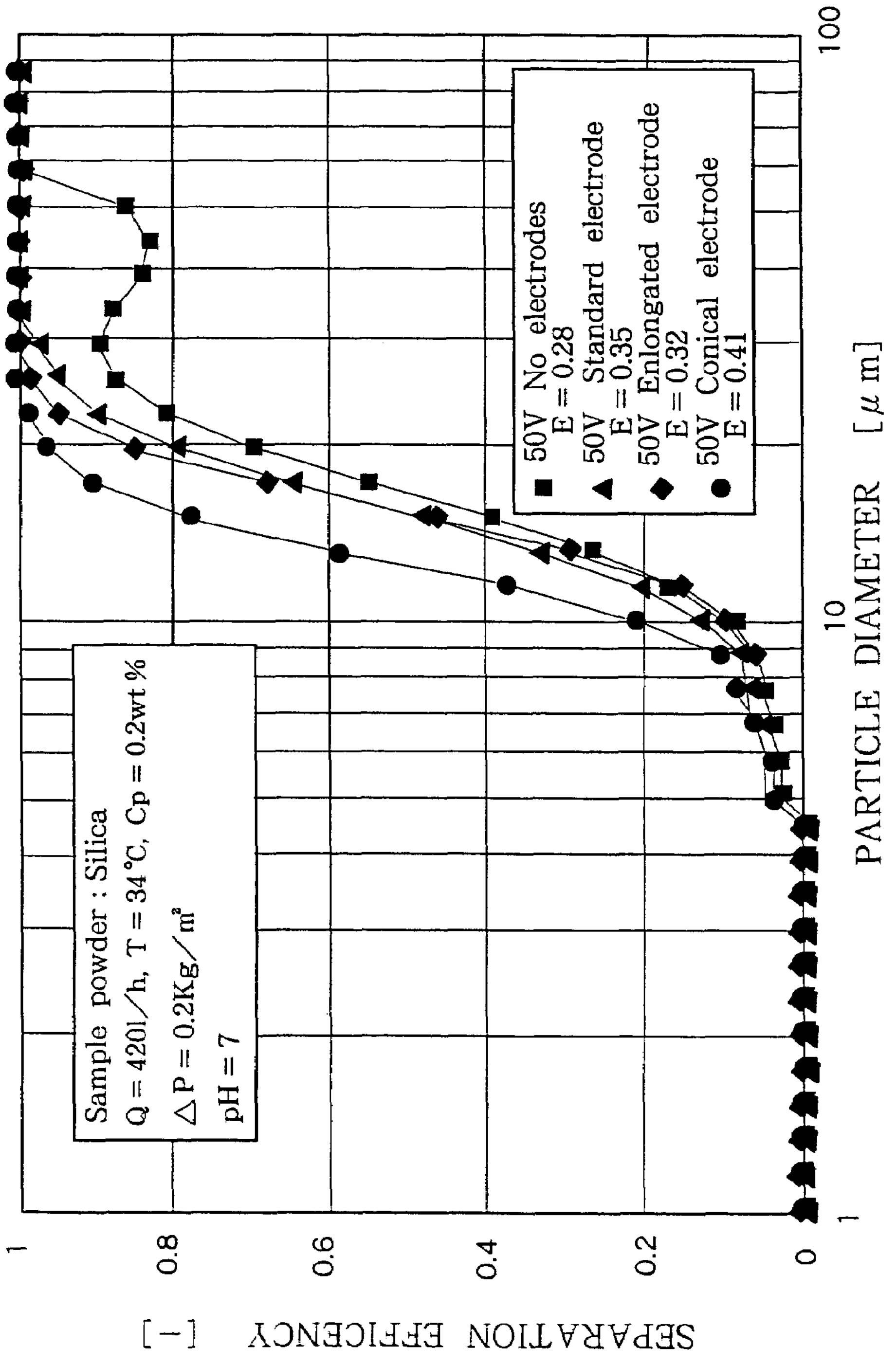
FIG. 10 shows the effect of the potential applied on the particle trap box on the separation performance.

The separation efficiency of silica particles in the sample powder was measured. The results are shown in FIG. 10. The measuring condition of the data in FIG. 10 was as follows:

Sample powder: silica particles

Dispersant: ion-exchange solution

Temperature (T) of dispersant: 34° C.

Flow rate (Q) of dispersant: 420 liters/h

Concentration (Cp) of the sample in the dispersant: 0.2 weight %

Differential pressure (ΔP) between the inlet and outlet: 0.2 $Kg/m^2$ pH: 7

The results of measurements in FIG. 8 and FIGS. 9A to 9H show that fine particles having a smaller diameter in the dispersant could be separated with better separation efficiency by using the cyclone separators shown in FIG. 7B having the same structure as in FIGS. 3 and 4, the cyclone separators shown in FIG. 7C having the same structure as in FIG. 5, and the cyclone separators shown in FIG. 7D having the same structure as in FIG. 6, than using the cyclone separator shown in FIG. 7A having the same structure as in FIGS. 3 and 4 having no electrode. Particularly, preferable results could be obtained by using the cyclone separator shown in FIG. 7D having the structure in FIG. 6, since fine particles in the dispersant having a small diameter could be separated with particularly improved separation efficiency.

What is claimed is:

1. A fine particle treatment system comprising:

a storage tank for storing a solution having fine particles contained therein, the storage tank comprising a solution inlet and a solution outlet;

a cyclone separator for separating the fine particles from the solution, the cyclone separator comprising a fluid inlet for accepting the fluid having fine particles from the storage tank solution outlet, a body portion for separating the particles from the solution by centrifugal force, a fluid outlet for discharging the solution from the cyclone separator and a particle outlet for discharging the separated particles from the cyclone separator;

fluid circulation means for introducing the solution having fine particles from the storage tank solution outlet into the cyclone separator fluid inlet and bringing the cyclone separator fluid outlet into fluid communication with the storage tank solution inlet; and a particle trap box for receiving the separated particles discharged from the cyclone separator particle outlet through a communication hole and attached thereto, the particle trap comprising an electrode rod disposed at the center thereof and a second electrode for applying a potential therebetween and remove impurity ions by electrophoresis.

2. The fine particle separation treatment system of claim 1, wherein the fine particles are electrically separated by charging the electrode rod with an electric charge opposed to that of the fine particles and by charging the second electrode with the same electric charge as that of the fine particles.

3. The fine particle separation treatment system of claim 1, wherein the cyclone separator is made of either an insulating material or a conductive metal.

4. The fine particle separation treatment system according to claim 1, wherein the fine particles are electrically separated by charging the electrode rod with the same electric charge as that of the fine particles and by charging the second electrode with an electric charge opposed to that of the fine particles.

5. The fine particle separation treatment system according to claim 1, wherein the fluid circulation means further comprises various devices that are operated or work using the solution.

6. The fine particle separation treatment system according to claim 1, wherein the upper end of the electrode rod extends to the particle outlet of the cyclone separator.

7. The fine particle separation treatment system according to claim 6, wherein a conical electrode is provided at the upper end of the electrode rod and this conical electrode is positioned so as to abut the communication hole.

8. The fine particle separation treatment system according to claim 1, wherein the cyclone separator comprises a cylinder part positioned at an upper part thereof and a downwardly tapered portion connected to the cylinder part and the length of the electrode bar is greater than the diameter of the cylinder part.

9. The fine particle separation treatment system according to claim 1, wherein the distance between the electrode of the particle trap box and the electrode rod is greater than the diameter of the communication hole.

* * * * *